US009145868B2

(12) United States Patent
Berry

(10) Patent No.: US 9,145,868 B2
(45) Date of Patent: Sep. 29, 2015

(54) VERTICAL AXIS TURBINE AND CONSTRUCTIONS EMPLOYING SAME

(71) Applicant: Air Era Technologies, LLC, Palm Beach Shores, FL (US)

(72) Inventor: George R. Berry, Palm Beach Shores, FL (US)

( * ) Notice: Subject to any disclaimer, the term of this patent is extended or adjusted under 35 U.S.C. 154(b) by 0 days.

(21) Appl. No.: 14/037,288

(22) Filed: Sep. 25, 2013

(65) Prior Publication Data
US 2015/0084341 A1    Mar. 26, 2015

(51) Int. Cl.
*F03D 9/00*    (2006.01)
(52) U.S. Cl.
CPC ...................... *F03D 9/002* (2013.01)
(58) Field of Classification Search
USPC .............................................. 415/4.4; 290/55
See application file for complete search history.

(56) References Cited

U.S. PATENT DOCUMENTS

| | | | | |
|---|---|---|---|---|
| 4,004,427 A * | 1/1977 | Butler, Jr. | ...................... | 60/698 |
| 6,242,818 B1 * | 6/2001 | Smedley | ...................... | 290/44 |
| 6,749,393 B2 * | 6/2004 | Sosonkina | ...................... | 415/4.1 |
| 7,646,132 B2 * | 1/2010 | Halstead | ...................... | 310/268 |
| D626,658 S * | 11/2010 | Desmarais et al. | ............ | D25/18 |
| 8,232,665 B2 * | 7/2012 | Sato | ................................. | 290/55 |
| 8,253,266 B2 * | 8/2012 | Elliott et al. | ..................... | 290/55 |
| 8,330,290 B2 * | 12/2012 | Pagliasotti | ...................... | 290/55 |
| 2009/0205264 A1 * | 8/2009 | Fisher et al. | ...................... | 52/65 |
| 2010/0013233 A1 * | 1/2010 | Buhtz | ................................ | 290/55 |
| 2010/0308597 A1 * | 12/2010 | Gyorgyi | .......................... | 290/55 |
| 2011/0204638 A1 * | 8/2011 | Lahtinen | ......................... | 290/44 |
| 2013/0236306 A1 * | 9/2013 | Cory | ................................ | 416/1 |

FOREIGN PATENT DOCUMENTS

WO    WO 03025388 A1 *    3/2003

* cited by examiner

Primary Examiner — Joseph Waks

(57) ABSTRACT

A building with an integrated wind-powered electricity generation system includes a plurality of floors, wherein each of the plurality of floors includes usable space. The building further includes a vacuum space between adjacent ones of the plurality of floors and a plurality of vertical axis wind turbines, wherein each of the plurality of vertical axis wind turbines is positioned adjacent the open vacuum space. The building further includes at least one electricity generator operably coupled to the plurality of vertical axis wind turbines. At least one of the vertical axis wind turbines includes a plurality of louvers extending around a portion of the outer circumference of the vertical axis wind turbine.

9 Claims, 4 Drawing Sheets

VERTICAL AXIS TURBINE AND CONSTRUCTIONS EMPLOYING SAME

FIELD OF THE INVENTION

This invention relates generally to buildings and more particularly to a building with an integrated system for generating electricity from wind.

BACKGROUND OF THE INVENTION

Recent reports indicate that buildings consume more than 40 percent of the energy used in the United States. As companies pursue environmental stewardship and reduced energy costs, energy efficiency has become an important aspect of modern architectural design. Although a number of improvements have been made to building materials which can decrease a building's overall energy requirement, little progress has been made in developing buildings that are capable of on-site energy generation.

Several past attempts have been made to incorporate wind-powered electrical generation systems into buildings. For example, U.S. Pat. No. 7,215,039 issued to Zambrano et al. discloses a wind turbine system that exploits an aerodynamically enhanced wind zone of a structure by aligning a plurality of horizontal axis wind turbine generators along a wall. U.S. Pat. No. 6,041,596 issued to Royer discloses an improved building structure that incorporates a tunnel-like opening that is adapted to contain a wind-sensitive generator. U.S. Pat. No. 6,765,309 issued to Tallal, Jr. et al. discloses one or more air intakes that funnel wind into a wind generator mounted internally to the structure. Similarly, U.S. Pat. No. 7,315,093 issued to Graham, Sr. discloses the use of a cylindrical wind turbine at the edge of a building's rooftop. Despite these previous designs, there continues to be a need for buildings that are capable of generating enough energy through wind to constitute an energy-neutral structure. It is to these and other deficiencies in the prior art that the preferred embodiments of the present invention are directed.

SUMMARY OF THE INVENTION

In preferred embodiments, the present invention includes a building with an integrated wind-powered electricity generation system. In one aspect, the building includes a first floor, a first radial turbine assembly, a second radial turbine assembly in superior relation to, and spaced apart from, the first turbine. Each radial turbine assembly is configured to rotate about a vertical axis. In a preferred embodiment, however, the first radial turbine rotates in a first direction (e.g. clockwise) and the second radial turbine rotates in a second, and opposite, direction (counter clockwise). The radial turbine assembly drives a conventional electromagnetic electricity generator.

In another aspect, the present invention provides a building with an integrated wind-powered electricity generation system in which the building includes a plurality of modules, wherein each of the modules includes a pair of first and second radial turbines. The building further includes a space between adjacent modules, thereby providing fluid communication between said modules, and the plurality of vertical axis radial wind turbines. In yet another aspect, at least one of the modules housing a pair of vertical axis radial wind turbines includes a plurality of independently rotating louvers extending around at least a portion of the outer circumference of each of the vertical axis radial wind turbines. The building further includes an electricity generator operably coupled to the vertical axis radial wind turbines

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1:
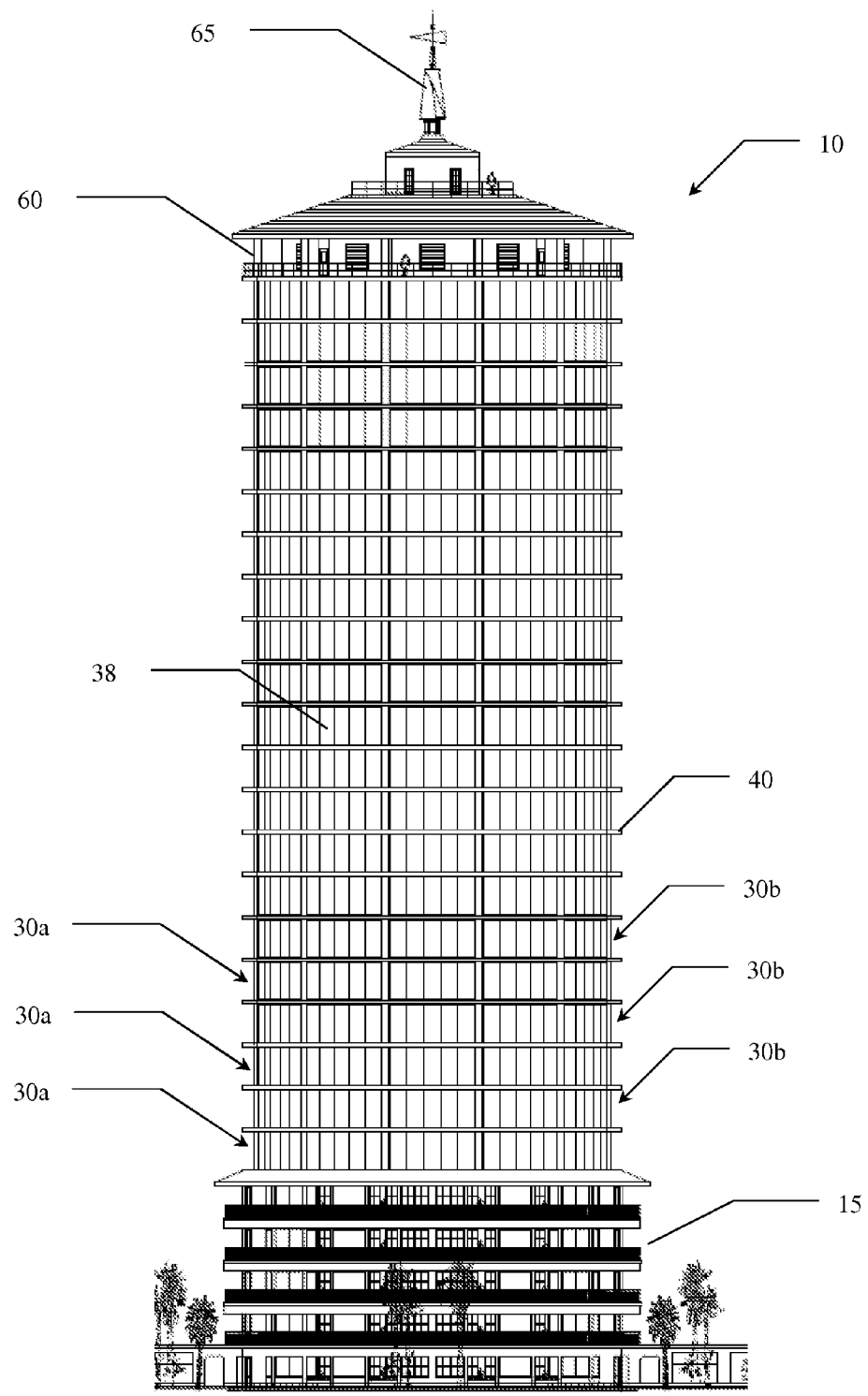
FIG. 1 is an elevational view of a building constructed in accordance with a preferred embodiment of the present invention.

Turning first to FIG. 1, shown therein is front elevational view of a structure 10 constructed in accordance with a preferred embodiment of the present invention. The structure 10 includes a plurality of alternating turbine modules (30a/30b) that are separated by corresponding structural supports 40. Each structural support 40 has a central aperture sufficient to allow airflow between adjacent alternating turbine modules (30a/30b). In the preferred embodiment shown in FIG. 1, the structure 10 has a substantially circular cross-section across the height of the structure 10. The shape of the structure 10 and the centrally apertured structural supports 40 encourage the flow of wind through alternating turbines 30a/30b and upward through structural supports 40. It will be appreciated by those of skill in the art, however, that the novel aspects of the present invention will find applicability in buildings of almost any size and design.

Figure 2:
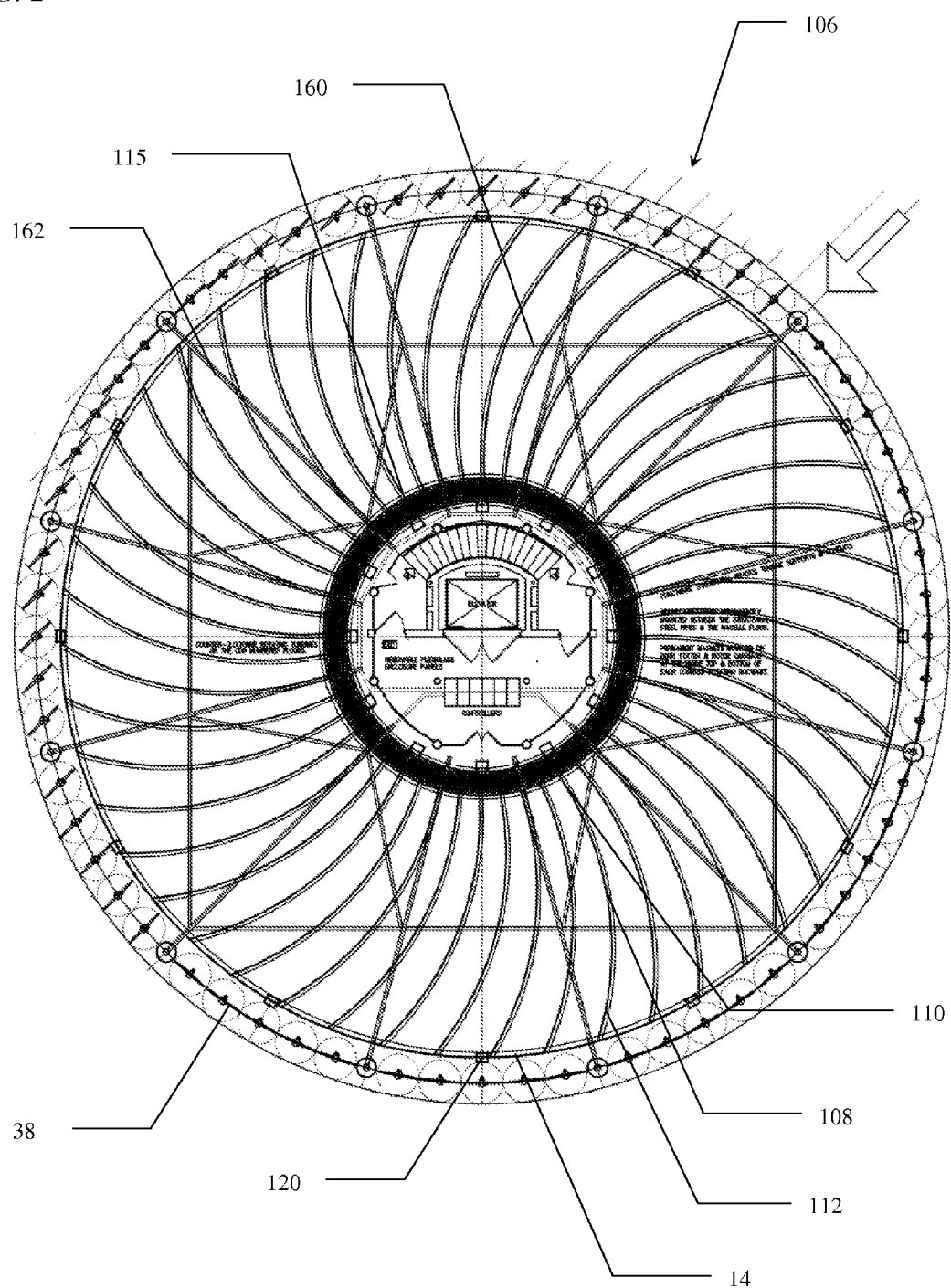
FIG. 2 is a top view of a turbine and generator constructed in accordance with a second preferred embodiment of the present invention.

Independent of the shape of the structure 10, at least one of alternating turbine modules 30a/30b includes a radial turbine assembly 106 (as shown in FIG. 2). The number of modules (30) and corresponding radial turbine assemblies 106 needed for a given building will be dependent on a number of factors, including the size and geometry of the building, environmental considerations and the design of the radial turbine assemblies 106. It will be appreciated that the present invention is not limited to a prescribed number of radial turbine assemblies 106.

Referring now to FIG. 2, each radial turbine assembly 106 includes a plurality of vanes 108 having proximal (110) and distal (112) ends. Each radial turbine assembly 106 is configured for rotational movement about a theoretical vertical axis extending through the structure 10. In this way, each radial turbine assembly 106 is configured as a vertical axis wind turbine (VAWT), in contrast to buildings that have incorporated wind-powered electricity generation facilities designed primarily as horizontal axis wind turbines (HAWT).

To permit the rotation of each radial turbine assembly 106, distal end 112 of each vane 108 is supported as it travels over a plurality of rotating support members (120) disposed on the outer ring 142 of the module 30. Outer support ring 142, as well as outer rotating support members 120, provide bearing surfaces between the first radial turbine (106a) of one module (30a) and the adjacent second radial turbine assembly (106b) of an inferiorly positioned module (30b) (see FIG. 3). In a particularly preferred embodiment, vanes 108 are largely constructed from lightweight carbon fiber materials, which exhibit favorable strength-to-weight characteristics. In the preferred embodiment, a magnetic bank 115 is connected to, and rotates with each of the vanes 108.

With further reference to FIG. 2, shown therein is a top diagrammatic depiction of a multiple radial turbine assemblies 106 housed within illustrative module 30a. In the preferred embodiments, each radial turbine module 30a/b includes cross members or other structural components that extend across the diameter thereof. For example, structural supports 160 structural integrity and strength to structure 10. Radially extending supports 162 provide a pathway for electrical conduit as well as additional structural support. The center of structure 10 also includes an interior-space (34) extending there through. Radially extending supports 162 extend from interior space 34. Structural supports 160, in contrast, surround and are connected to the outer walls of interior space 34. Interior space 34 permits the use of the interstitial space therein for housing and building resources, such as elevators, plumbing, electrical service and HVAC equipment and conduit.

Figure 3:
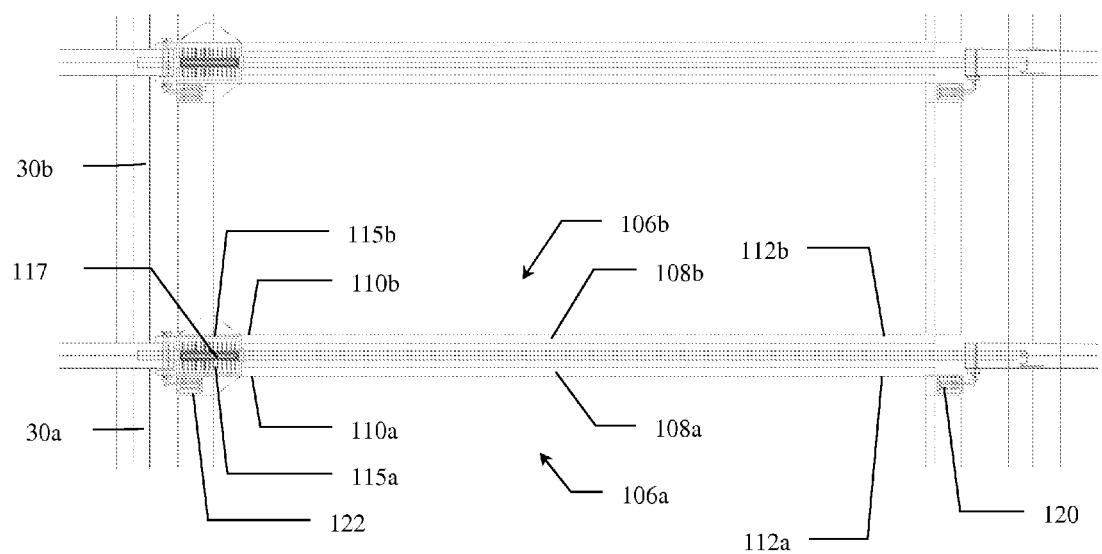
FIG. 3 is a perspective view of a turbine assembly of FIG. 2.

Referring now to FIG. 3, each radial turbine assembly 106 is operably coupled to a generator comprising a fixed stator 117. In a preferred embodiment, stator 117 further comprises an iron core and copper windings. As shown in FIG. 3, first module 30a is shown in inferior relation to second module 30b. First module 30a comprises first radial turbine assembly 106a which further includes a first, clockwise rotating, vane 108a having proximal end 110a and distal end 112a. Proximal end 110a includes magnetic bank 115a. shown in inferior relation to stator 117. In the embodiment shown in FIG. 3, magnetic bank 115a includes north-polar neodymium permanent magnets. Distal end 112a of vane 108a is supported by outer rotating support 120, whereas proximal end 110a is supported by inner rotating support 122.

Similarly, second module 30b. placed in superior relation to first module 30a, comprises second radial turbine assembly 106b which further includes a second, counter-clockwise rotating, vane 108b having proximal end 110b and distal end 112b. Proximal end 110b includes magnetic bank 115b. shown in superior relation to stator 117.

In all wind turbines, the amount of power available is proportional to the cross-sectional area of rotors (magnet bank 115). The amount of power available is proportional to the velocity cubed, thus doubling the wind velocity makes increases the resulting power by a factor of eight. As wind velocity increases, however, rotor tip speed also increases, which is the common limiting factor in conventional designs.

Both sets of vanes (108a/108b) are designed to draw air inward from the sides and below and then direct it upward to an adjacent radial turbine assembly. For example, the embodiments depicted in FIGS. 2-3 depict a radial turbine assembly 106 constructed as an independent airfoil that resembles a lift-based vertical axis turbine similar to a Daerrieus wind turbine. In this embodiment, each vane 108 operates by creating lift through a differential pressure exerted across each airfoil vane 108.

In addition to the various vane designs depicted in FIGS. 2-3, it will be appreciated that other vane designs will fall within the scope of preferred embodiments. Additionally, it may be desirable to employ a variety of vane designs in a single radial turbine assembly 106. For example, it may be desirable to provide lift-based and drag-based vanes 108 in a single radial turbine assembly 106. Furthermore, if the structure 10 includes multiple radial turbine assemblies 106, each radial turbine assembly 106 may include vanes 108 with designs that are unique to that radial turbine assembly 106.

During operation, wind acting on the vanes 108 causes the radial turbine assembly 106 to rotate. The movement of the magnetic banks (115), acting as rotors, over the stator 117 converts the mechanical energy from the radial turbine assembly 106 into electricity through well-known principles. Although not separately shown, the generator 116 may include devices for conditioning the generated electricity for use in the structure 10. It will be understood that converters or conditioners may reside outside the generator. Furthermore, although FIG. 3 depicts a single stator 117 coupled directly to a pair of alternating rotating radial turbine assemblies 106a/106b. it will be recognized that the present invention is not so limited. It may be desirable in certain applications to connect a single stator 117 to a single radial turbine assembly 106. Moreover, additional generators (including mechanical units) can be connected to a single or multiple radial turbine assemblies 106 through common shafts or linkages extending between adjacent alternating modules (30a/30b) and radial turbine assemblies 106.

The present invention contemplates the use of a variety of vane designs that can be selected to provide optimal performance based on environmental and other factors. Generally, the vanes 108 of presently preferred embodiments can be classified as either lift-based vanes or drag-based vanes. Exemplars of both classes are described below. The vanes 108 are configured as vertically-oriented paddle-style blades that operate on drag forces. This blade design is typically less efficient than complex blade designs, but the symmetrical vertical form of the vanes 108 permits the rotation of the radial turbine assembly 106 in both directions.

Referring again to FIG. 1, shown therein is an elevational view of the structure 10 that includes a plurality of modules (30, 30a/30b) housing radial turbine assemblies (not shown) that incorporate louvers 38. FIG. 2 provides a top diagrammatic close-up depiction of a single radial turbine assembly 106 that includes a plurality of louvers 38. Louvers 38 are rotatably mounted on a track that extends around a portion of the outer circumference of the radial turbine assembly 106. Louvers 38 are configured for motorized rotation around the outer circumference of the radial turbine assembly 106 on the track to selectively cover a series of adjacent vanes 108.

Figure 4:
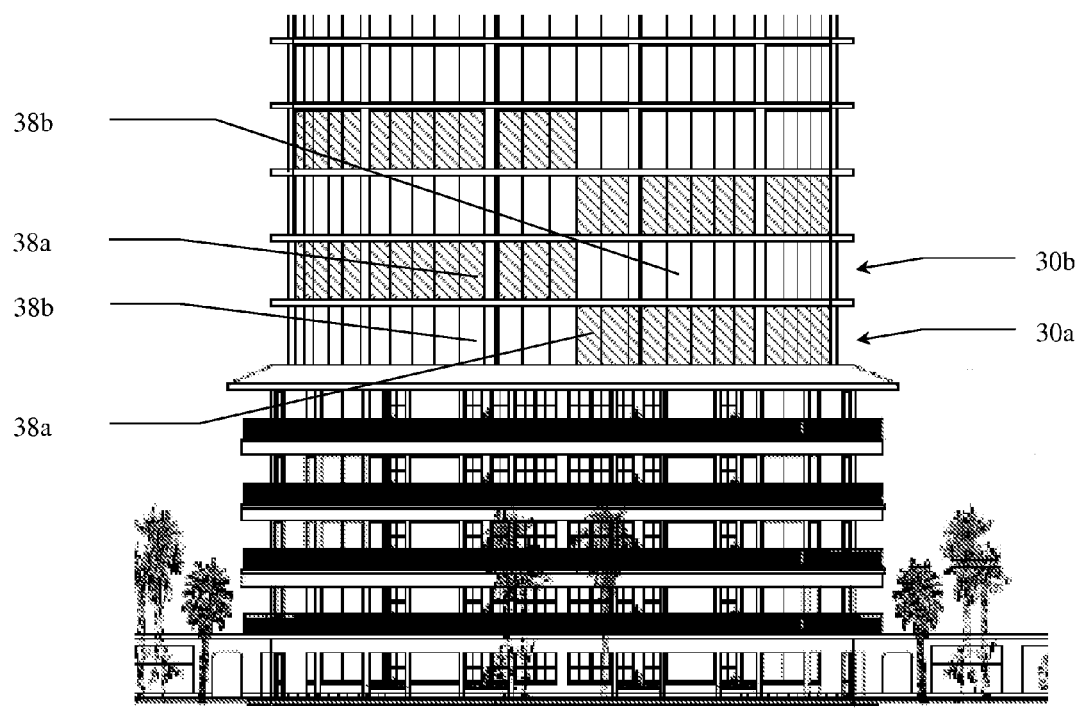
FIG. 4 is an elevational view of a building constructed in accordance with a preferred embodiment of the present invention.

As shown in FIG. 4, depicting an elevational view of the windward side of structure 10 that includes a plurality of modules (30, 30a/30b) housing radial turbine assemblies (not shown) that incorporate louvers 38. In this example, modules 30a house clockwise rotating radial turbine assemblies whereas modulses 30b house counterclockwise rotating radial turbine assemblies. To facilitate rotation, louvers 38a on the right-hand side of structure 10 are closed. Similarly, louvers 38b on the left-hand side of structure 10 are closed. This arrangement encourages wind to move inside and upward within structure 10.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense. Any materials, which may be cited above, are fully incorporated herein by reference.

To prevent the radial turbine assembly 106 from stalling, the vanes 108 are covered by louvers 38 on a portion of the windward side of the structure 10. Covering a portion of the vanes 108 enhances the rotation of the radial turbine assembly 106. If the radial turbine assembly 106 includes vanes 108 that permit rotation in both directions, louvers 38 can also be used to control the direction of rotation. In the preferred embodiment depicted in FIGS. 2-4, the wind louvers 38 are configured to cover about one-third to one-half of the vanes 108 in each radial turbine assembly 106. In a particularly preferred embodiment, louvers 38 are configured to cover one-half of the circumference of the radial turbine assembly 106. The movement of louvers 38 is preferably automatically controlled in response to real-time weather information obtained from sensors located on or near the structure 10.

It is also to be understood that the following claims are intended to cover all of the generic and specific features of the invention herein described, and all statements of the scope of the invention which, as a matter of language, might be said to fall therebetween. Relative terminology, such as "substantially" or "about," describe the specified materials, steps, parameters or ranges as well as those that do not materially affect the basic and novel characteristics of the claimed inventions as whole (as would be appreciated by one of ordinary skill in the art). Now that the invention has been described,

What is claimed is:

1. A building with an integrated wind-powered electricity generation system, wherein the building includes:
    a first radial turbine assembly configured to rotate about a vertical axis;
    a second radial turbine assembly configured to rotate about a vertical axis, disposed in superior relation to the first radial turbine assembly; wherein the first and second radial turbine assemblies are in fluid communication and further comprise:
    i. a plurality of radially disposed set of vanes, each having a proximal and distal end, wherein each of said set of vanes drawing air inward from the sides and below said set of vanes and directing the air upward to an adjacent radial turbine assembly; and
    ii. a magnetic bank disposed adjacent the proximal end of each of the plurality of vanes; and
    wherein at least a portion of the plurality of vanes are configured as lift-based vanes.

2. The building of claim 1, wherein the radial turbine assembly rotates about a vertical axis extending through the center of the building.

3. The building of claim 1 further comprising at least one stator communicatively coupled with at least one magnetic bank disposed on the proximal end of each of the plurality of vanes on the first and second radial turbine assemblies.

4. The building of claim 1, wherein the first and second radial turbine assemblies further comprise a plurality of louvers extending around the outside of a portion of the radial turbine assembly, wherein the louvers are selectively rotatable.

5. The building of claim 4, wherein the louvers are closed to obscure about one-half of the outer circumference of the radial turbine assembly.

6. The building of claim 4, wherein the louvers are closed to obscure about one-fourth of the outer circumference of the radial turbine assembly.

7. The building of claim 4, wherein the louvers are closed to obscure about three-fourths of the outer circumference of the radial turbine assembly.

8. The building of claim 1, wherein the building comprises a circular cross-section that varies in diameter across the height of the building.

9. The building of claim 1, wherein the building comprises a circular cross-section that is constant in diameter across the height of the building.

* * * * *